United States Patent Office 3,361,474
Patented Jan. 2, 1968

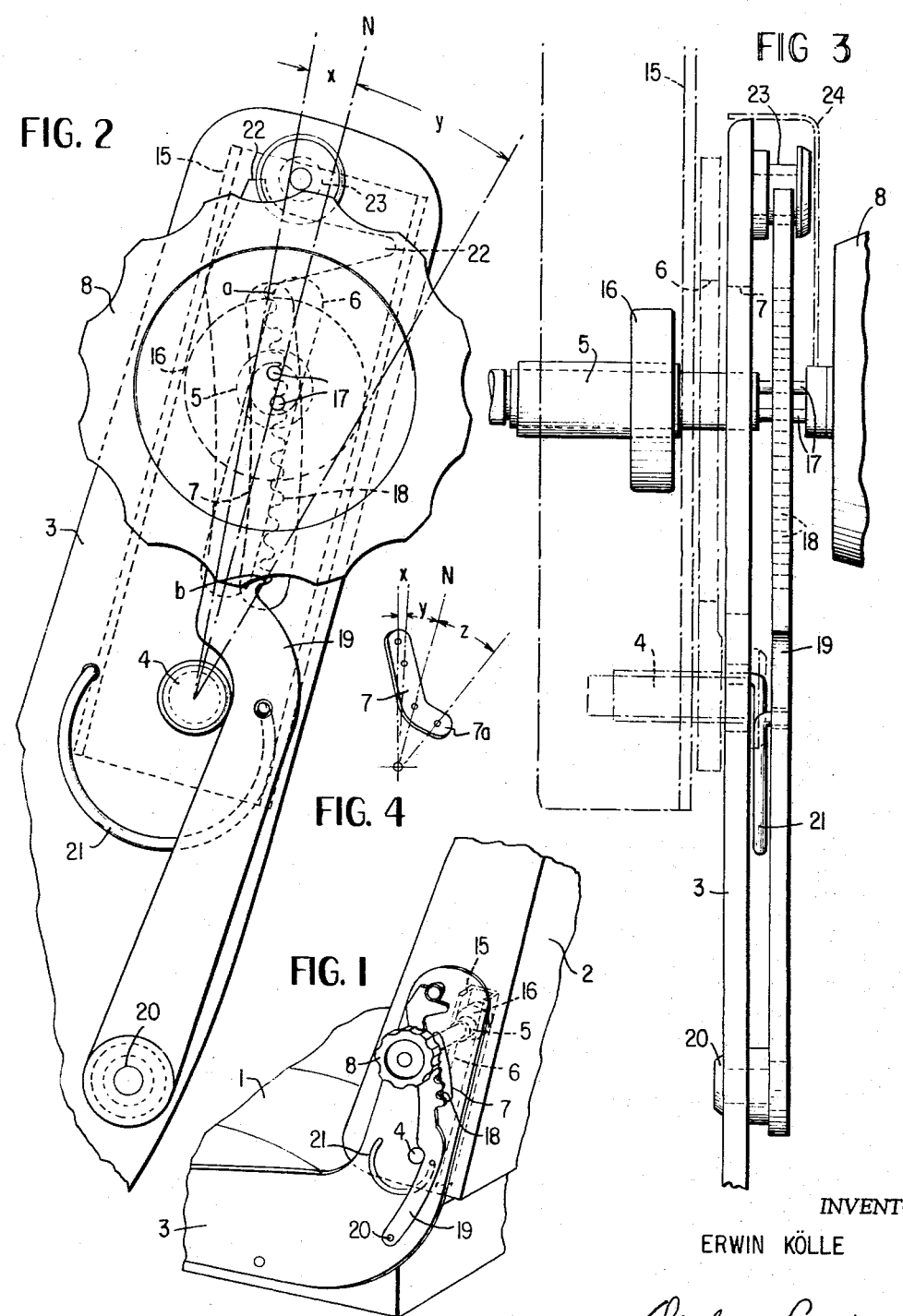

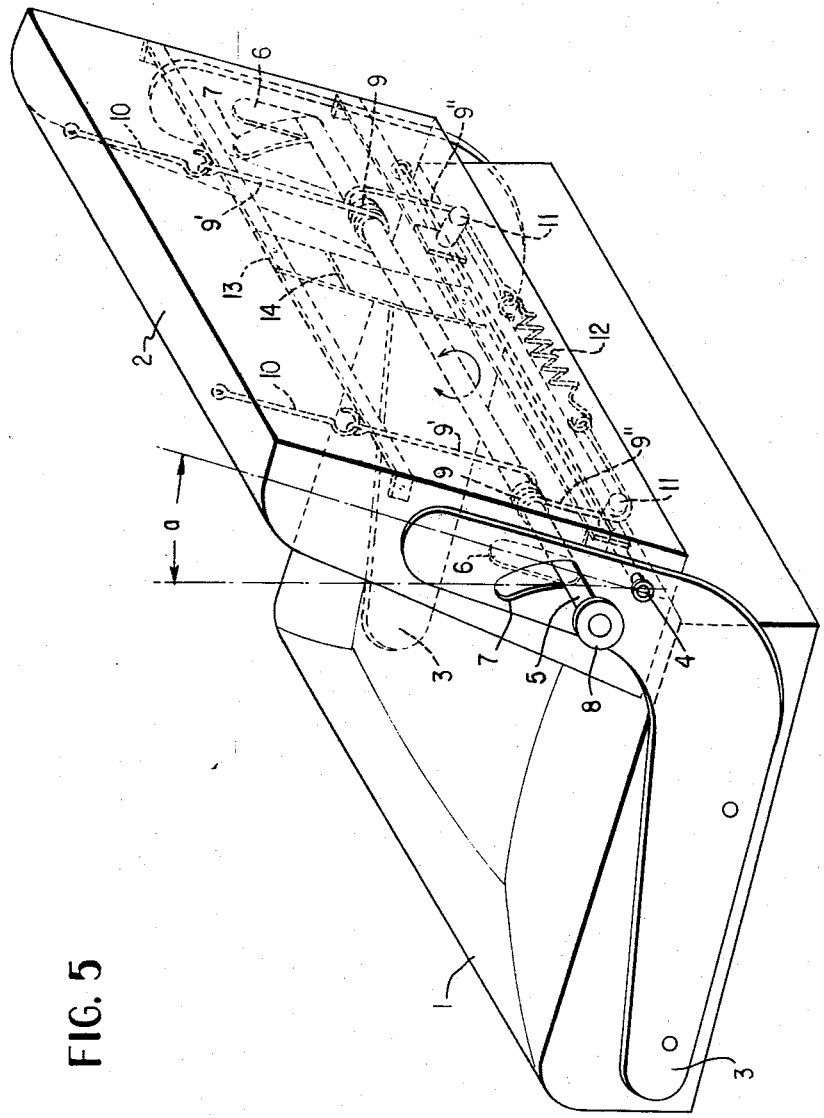

3,361,474
ADJUSTABLE BACK-REST FOR VEHICLE SEATS
Erwin Kölle, Sindelfingen, Wurttemberg, Germany, assignor to Daimler-Benz Aktiengesellschaft, Stuttgart-Unterturkheim, Germany
Filed Nov. 26, 1965, Ser. No. 509,936
Claims priority, application Germany, Nov. 27, 1964, D 45,930
19 Claims. (Cl. 297—374)

ABSTRACT OF THE DISCLOSURE

The present disclosure relates to an installation for the adjustment of the back-rests of seats, especially for motor vehicles, and more particularly relates to an improvement and further construction of such a back-rest adjusting mechanism, which is pivotally connected with the seat by means of pivot pins or a pivot shaft arranged in the lower part of the back-rest and which are adjustable in the inclined position by means of an adjusting shaft guided in rectilinear slots of the two lateral back-rest frames and in curved slots of the mounting brackets arranged securely at the seat, whereby the adjusting shaft is under the influence of a braking means.

---

The present invention aims at making the adjusting mechanism safe against an unintentional backward folding or pivoting of the back-rest, for example, during sudden vehicle accelerations, or also when the passengers drop themselves into the seat during seating thereof.

In one embodiment, the present invention essentially consists in that the adjusting shaft is provided with toothed means which engages with a row of teeth following the curvature of the slots at the securely arranged mounting brackets. A self-locking mangle-gear-type transmission means is provided at a pivot lever as the toothed means which holds the toothed means in the engaged position by a spring. The toothed means cooperate with the braking effect of one or several rubber rollers seated or mounted on the adjusting shaft, which roll off under prestress on rails provided at or in the back-rest.

In a modified construction, the present invention essentially consists in that the adjusting shaft is supported in several turns of two vertically arranged ropes or cables secured at the ends thereof in the back-rest frame and stands under the effect of a braking spring.

Contrasted to the known adjusting possibility with threaded bolts, clamped by means of wing nuts, as used with reclining chairs for domestic purposes, the seat-adjusting mechanism according to the present invention offers the advantage of a self-locking, stepless and handy adjusting possibility consisting of simple means also with a loaded back-rest, which is particularly important for motor vehicles.

Accordingly, it is an object of the present invention to provide an adjusting mechanism for the back-rest of seats, especially for motor vehicles, which is simple in construction as well as reliable in operation yet avoids the drawbacks encountered with the prior art constructions.

Another object of the present invention resides in the provision of a back-rest adjusting mechanism for vehicle seats, especially the seats of passenger motor vehicles which permits a safe adjustment of the back-rest even under load.

Still a further object of the present invention resides in an adjusting mechanism for the back-rests of motor vehicle seats which is provided with braking means of simple construction that prevent an unintentional reclining or folding back of the back-rest during sudden accelerations of the vehicle or upon sudden application of forces seeking to pivot the back-rest into the reclining position thereof.

Still another object of the present invention resides in the provision of a self-locking adjusting mechanism for the back-rest of a vehicle seat which consists of simple means that can be readily manipulated.

A further object of the present invention resides in an adjusting mechanism of the type described above which achieves the aforementioned aims and objects by simple means, yet at the same time offers a stepless adjustability.

These and further objects, features, and advantages of the present invention will become more obvious from the following description when taken in connection with the accompanying drawing which shows, for purposes of illustration only, several embodiments in accordance with the present invention, and wherein:

FIGURE 1 is a partial perspective view on the seat and back-rest mounting brackets provided with an adjusting mechanism in accordance with the present invention;

FIGURE 2 is a partial elevational view, on an enlarged scale, of the adjusting mechanism for the back-rest according to FIGURE 1;

FIGURE 3 is a partial right side elevational view of the adjusting mechanism of FIGURE 2;

FIGURE 4 is a schematic view illustrating in elevation and on a scale corresponding to that of FIGURE 1, a further modified construction of the guide slot in accordance with the present invention, provided at the rigid back-rest fitting or mounting bracket, and FIGURE 5 is a perspective view on a seat and back-rest for a motor vehicle provided with a modified construction of an adjusting mechanism for the back-rest in accordance with the present invention.

Referring now to the drawing wherein like reference numerals are used throughout the various views to designate like parts, and more particularly to FIGURE 1, reference numeral 1 designates therein the usual seat cushion, and reference numeral 2 the adjustable back-rest. In FIGURE 3, the fittings and mounting parts belonging to the back-rest are shown in dash and dot lines for sake of clarity. An angularly shaped mounting bracket 3 is secured on each side of the seat 1 at the conventional seat frame thereof (not shown). The horizontal arm of the mounting bracket 3 holds the seat 1 and the vertical arm thereof serves as support and guidance for the back-rest 2. The back-rest 2 is pivotally mounted on a lower transverse shaft or on two pivot pins 4 provided in lieu thereof which are secured at the seat brackets 3. A rotatably supported rod is disposed at a certain distance above the pivot pins 4 as back-rest adjusting shaft 5, whose two ends extend through a respective rectilinear longitudinal slot 6 in each of the back-rest lateral walls and simultaneously through a slot 7 which is either rectilinear and inclined or curved or rearwardly angularly bent and which is provided in each of the upright mounting brackets 3. A twisting knob 8 is arranged at each of the two projecting ends of the adjusting shaft 5 or only at one end thereof, preferably at the end disposed on the outside of the seat. Guide rails 15, for example, U-shaped or angle-shaped guide rails 15, are arranged in the side walls of the back-rest 2. Rubber rollers 16 mounted on the adjusting shaft 5 roll off along the guide rails 15 with prestress. Additionally, the drive shaft 5 is provided directly behind the actuating knob 8 with two driving gear-type pins 17 preferably arranged adjacent one another at a slight distance, which engage in a row of teeth 18 following the curvature of the slot 7. This row of teeth 18 is provided along the edge of pivot lever 19 of relatively flat cross section which is rotatably supported at 20 below the pivot pins 4 and is under the influence, for example, of a bow spring 21 which holds the lever teeth 18 in springy, yielding engagement with the self-locking driving pins 17. The lever 19 is provided above the row of teeth 18 with a nose 22 projecting therebeyond which passes over into an abutment 22' extending the lever arm 19. The abutment 22' cooperates with a fixed abutment 23 at the fixed back-rest mounting part 3. The abutment 23 may be screened off with respect to the knob 8 by means of a shield 24 (FIG. 3).

Operation

The operation of the back-rest adjusting mechanism described hereinabove is as follows:

In FIGURE 2, the normal position of the back-rest 2 is indicated by N and can be adjusted forwardly by the angle x, of, for example, 4° and toward the rear by the angle y of, for example, about 20°. For this purpose, one only needs to rotate the knob 8 in the clockwise or counter-clockwise direction. As a result thereof, the self-locking driving pins 17 of the pin-type gear roll off along the teeth 18, whereupon the adjusting shaft 5 moves upward or downward in the slot 7. The end positions are indicated in FIGURE 2 by reference characters a and b. During the movement of the adjusting shaft 5 in the slot 7, the shaft 5 naturally also moves within slot 6 of the back-rest 2 with the consequence that the back-rest 2 is displaced forwardly or rearwardly and is adjusted correspondingly into a more upright position or into a further backward reclining position.

During the rotation of the adjusting shaft 5, the toothed lever 19 yields each time to the pressure of the driving pins 17 against the effect of the spring 21 and re-assumes its engaging position as soon as the two pins 17 are disposed again in the pitch circle of the teeth 18. By reason of the self-locking effect of this toothed construction and the braking effect of the rubber roller 16, the back-rest 2 remains blocked in all positions against any undesired pivot movement.

If one desires to adjust the back-rest 2 still further backwardly into a further reclining position, then it is only necessary to extend the slot 7 toward the rear at its lower end by the angularly bent portion 7a as shown in FIGURE 4. As a result thereof, the adjusting angle toward the rear is enlarged by the angle z. Depending on the height position of the pivot axis 4 of the back-rest 2 with respect to the seat 1, one obtains a step forming a type of a head rest or head cushion. However, it is also possible to construct the back-rest so as to be pivotal completely into the plane of the seat.

In the embodiment of FIGURE 5, reference numeral 1 designates again the seat cushion and reference numeral 2 the adjustable back-rest. An angularly shaped seat bracket 3 is secured to the seat cushion frame on each side of the seat. The horizontal arms of the brackets 3 support the seat and the upright arms serve again as support and guidance for the back-rest 2. For this purpose, the back-rest 2 is pivotal about a lower transverse shaft 4 or on two pivot pins 4 provided in lieu thereof which are secured at the seat brackets 3. An adjusting shaft 5 is disposed at a distance above the pivot shaft 4, parallel thereto, the two ends of shaft 5 extend through a respective upright slot 6 in the lateral walls of the back-rest 2 and at the same time through a respective slot 7 which may be either rectilinear and inclined or curved and which is provided in the upright portions of the seat brackets 3. An actuating knob 8 is again arranged at each of the two projecting ends or only at one projecting end of the adjusting rod 5, preferably at that end disposed on the vehicle outside of the seat. The adjusting rod 5 is additionally suspended in the windings 9 of two vertically arranged ropes or cables 9' and 9" whose upper and lower ends are essentially fixed. The ends of the upper cable sections 9' are suspended in hooks 10 which hang downwardly from the upper end of the back-rest body 2, for example, which are secured in the back-rest frame. The lower cable sections 9" are guided about the deflection pins or rollers 11. The horizontal ends of the cable sections 9" which extend toward one another are inserted into the hook-like ends of a common tension spring 12. Additionally, a central, vertically arranged leaf spring 13 presses against the adjusting shaft 5. The center section 14 of the leaf spring 13 is roughened up by a corresponding roughening of the surface thereof or also by a winding of a metallic wire or a string and is thereby made safe against sliding.

Operation

The operation of the embodiment illustrated in FIGURE 5 is believed clear from an inspection of this figure. As a result of the effect of the spring 13, 14 on the adjusting rod 5, of the friction of the rod 5 at the edges of the slot guidances 6, 7 and of the clamping force of the cable windings 9, the back-rest adjusting mechanism is operable in a self-locking manner, especially when the slots 6 and 7 are so constructed and arranged to one another that the tangential plane determined by the lines of action between the rod 5 and the slots 6, 7 subtends in each position of the back-rest an angle that holds fast the adjusting rod 5 in each position by its clamping or wedging effect.

FIGURE 5 illustrates the back-rest 2 in its furthest reclined position. If one rotates the knob 8 and therewith also the adjusting shaft 5 in the clockwise direction, then the windings or loops 9 are displaced in the upward direction and also the rod 5 is moved upwardly in unison within the slot guidances 6, 7. The curved slots 7 thereby force the rod 5 simultaneously into a movement toward the front and the rod 5 takes along the back-rest 2 in the direction of arrow a. With the rotation of the knob 8 in the counter-clockwise direction, the rod 5 moves within the curved guide slots 7 of the seat brackets 3 again toward the rear and downwardly. Correspondingly, the back-rest 2 is again pivoted into the reclining position.

Depending on the angular position of the vertical arm of the seat bracket 3, and on the configuration and length of the guide slots thereof, the limits of the pivotal movements of the back-rest toward the front and rear can be selected in any suitable, desired manner. The spring 12 assures a predetermined tension in the cable sections so that the loop bearings 9 always have the same height position relative to one another.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. An adjusting mechanism for adjusting the back-rest of seats, especially for motor vehicles, having seat means, and back-rest means, comprising pivotal connecting means in the lower part of the back-rest means for pivotally connecting said back-rest means to said seat means, lateral mounting means secured to said seat means including upright arm portions, said back-rest means being provided with frame means, and adjusting means for adjusting the position of said back-rest means including adjusting shaft means guided in substantially straight slot means provided in the two lateral frame means of the back-rest means and in further slot means angularly disposed to said straight slot means and provided in the arm portions of said mounting means, and further means for securely holding said adjusting shaft means in any adjusted position to thereby also hold said back-rest means in the adjusted position thereof.

2. The adjusting mechanism according to claim 1, wherein said further slot means are substantially straight and inclined relative to said straight slot means.

3. The adjusting mechanism according to claim 1, wherein said further slot means are curved.

4. The adjusting mechanism according to claim 1, wherein said further slot means are angularly shaped.

5. The adjusting mechanism according to claim 1, wherein said further means includes means effectively providing a strong braking effect on said adjusting shaft means.

6. The adjusting mechanism according to claim 1, wherein said further means includes two substantially vertical cable means forming several loops about said adjusting shaft means, the ends of said cable means being secured to the frame means of said back-rest means, and brake spring means operatively connected with said adjusting shaft means.

7. The combination according to claim 6, wherein said brake spring means is a vertical leaf spring arranged between the two cable means.

8. The combination according to claim 7, wherein the effective section of said leaf spring is provided with means producing a substantially non-sliding engagement with said adjusting shaft means.

9. The combination according to claim 8, wherein said last-mentioned means is formed by a roughened-up surface.

10. The combination according to claim 8, wherein said last-mentioned means is constituted by a plurality of turns on said leaf spring.

11. The combination according to claim 8, further comprising hook means for suspending the upper ends of the cable means in the upper frame part of the back-rest means, deflection roller means for guiding the lower ends of said cable means, and tensional spring means for connecting with each other the lower ends of said cable means.

12. The combination according to claim 6, further comprising hook means for suspending the upper ends of the cable means in the upper frame part of the back-rest means, deflection roller means for guiding the lower ends of said cable means, and tensional spring means for connecting with each other the lower ends of said cable means.

13. The adjusting mechanism according to claim 1, wherein said further means includes tooth means provided at said adjusting shaft means, and a row of teeth at said mounting means, said row of teeth substantially following the configuration of said further slot means, and said first-mentioned tooth means engaging in the teeth of said row of teeth.

14. The combination according to claim 13, further comprising pivot lever means provided with said row of teeth, and spring means operatively connected with said pivot lever means for keeping said teeth in engagement with the tooth means of said adjusting shaft means.

15. The combination according to claim 14, further comprising self-locking driving means between said adjusting shaft means and said pivot lever means.

16. The combination according to claim 15, wherein said self-locking driving means includes brake means in the form of elastic roller means mounted on said adjusting shaft means, and rail means provided in said back-rest means, said roller means rolling off in said rail means under prestress.

17. A seat, comprising: a lower frame; a generally horizontal lower seat cushion mounted on said lower frame; an upper frame pivotally mounted on said lower frame for pivotal movement relative to said lower frame and said seat cushion; a backrest mounted on said upper frame for pivotal movement therewith; adjustment means for holding said upper frame and backrest in a plurality of selected pivoted positions relative to said lower frame and said seat cushion within an angular range of pivoted adjustment; said adjustment means including a first slot in said lower frame, a second slot in said upper frame intersecting said first slot in all pivoted positions within said angular range, and an adjustment shaft extending through said first and second slot at their intersection and being mounted for movement relative to each of said lower frame and said upper frame; said first slot and said second slot being mounted to have different portions aligned in intersection for each adjusted position within said angular range.

18. The seat according to claim 17, including drive means on one frame of said upper and lower frames to selectively drive said shaft along the slot in said one frame and pivot the other frame by the camming action between said shaft and the slot of said other frame.

19. The seat according to claim 18, including separate means to automatically brake and hold said shaft in any of its adjusted positions.

References Cited

UNITED STATES PATENTS

| | | | |
|---|---|---|---|
| 2,732,888 | 1/1956 | Jones | 297—374 |
| 2,745,471 | 5/1956 | Chappuis et al. | 297—374 |
| 2,802,516 | 8/1957 | Liljengren | 297—374 |
| 2,912,045 | 11/1959 | Milly | 297—363 |
| 3,044,830 | 7/1962 | Kolle | 297—361 |
| 3,195,952 | 7/1965 | Bache et al. | 297—374 |
| 3,262,737 | 7/1966 | Martens | 297—379 |

BOBBY R. GAY, *Primary Examiner.*

FRANK B. SHERRY, *Examiner.*

G. O. FINCH, *Assistant Examiner.*